US010474658B2

(12) United States Patent
Seering et al.

(10) Patent No.: US 10,474,658 B2
(45) Date of Patent: Nov. 12, 2019

(54) USER-DEFINED LOADING OF DATA ONTO A DATABASE

(75) Inventors: Adam Seering, Brookline, MA (US); Rajat Venkatesh, Billerica, MA (US); Charles Edward Bear, Hudson, MA (US); Shilpa Lawande, Littleton, MA (US); Andrew Allinson Lamb, Boston, MA (US)

(73) Assignee: MICRO FOCUS LLC, Santa Clara, CA (US)

( * ) Notice: Subject to any disclaimer, the term of this patent is extended or adjusted under 35 U.S.C. 154(b) by 452 days.

(21) Appl. No.: 14/405,563

(22) PCT Filed: Jun. 4, 2012

(86) PCT No.: PCT/US2012/040764
§ 371 (c)(1),
(2), (4) Date: Dec. 4, 2014

(87) PCT Pub. No.: WO2013/184093
PCT Pub. Date: Dec. 12, 2013

(65) Prior Publication Data
US 2015/0178342 A1   Jun. 25, 2015

(51) Int. Cl.
*G06F 16/22*  (2019.01)
*G06F 16/21*  (2019.01)
(Continued)

(52) U.S. Cl.
CPC ............ *G06F 16/2291* (2019.01); *G06F 7/36* (2013.01); *G06F 16/214* (2019.01);
(Continued)

(58) Field of Classification Search
None
See application file for complete search history.

(56) References Cited

U.S. PATENT DOCUMENTS 5,828,579 A    10/1998 Beausang
6,718,336 B1 *  4/2004 Saffer ............... G06F 17/30557
(Continued)

FOREIGN PATENT DOCUMENTS

CN    101290622    10/2008
CN    101452450    6/2009
(Continued)

OTHER PUBLICATIONS

Durbin, J. et al., "SQL*Loader Concepts," (Web Page), Oracle8 Utilities, Release 8.0, XP-002269379, Dec. 1997, 10 pages, available at http://otn.oracle.co.kr/docs/oracle78/server.804/a58244/ch03.htm.

(Continued)

*Primary Examiner* — Uyen T Le

(57) ABSTRACT

As part of managing the loading of data from a source onto a database, according to an example, an interface through which a user is to define logic related to the loading of the data onto the database is provided. The user-defined logic pertains to at least one of a user-defined location identification of the source, a user-defined filter to be applied on the data, and a user-defined parsing operation to be performed on the data to convert the data into an appropriate format for the database. In addition, the user-defined logic is received and the user-defined logic is implemented to load the data onto the database.

20 Claims, 5 Drawing Sheets

(51) Int. Cl.
*H04L 29/08* (2006.01)
*G06F 7/36* (2006.01)
*G06F 17/27* (2006.01)
*G06F 16/25* (2019.01)

(52) U.S. Cl.
CPC .......... *G06F 16/254* (2019.01); *G06F 16/258* (2019.01); *G06F 17/2705* (2013.01); *H04L 67/2823* (2013.01)

(56) References Cited

U.S. PATENT DOCUMENTS

| | | | |
|---|---|---|---|
| 7,016,911 | B2 | 3/2006 | Bousfield et al. |
| 7,017,156 | B1* | 3/2006 | Rhee ..................... G06F 9/4881 |
| | | | 718/100 |
| 7,159,185 | B1* | 1/2007 | Vedula ..................... G06F 8/34 |
| | | | 715/201 |
| 7,657,505 | B2* | 2/2010 | Hejlsberg .......... G06F 16/24552 |
| | | | 707/999.002 |
| 7,730,450 | B2 | 6/2010 | Mercer |
| 7,941,402 | B2 | 5/2011 | Smits |
| 8,165,988 | B2 | 4/2012 | Shau et al. |
| 2006/0047525 | A1* | 3/2006 | Ziv ........................ G06Q 10/00 |
| | | | 705/1.1 |
| 2006/0085482 | A1* | 4/2006 | Trowbridge ............ G06F 9/445 |
| 2006/0218532 | A1* | 9/2006 | Cordella ................. G06F 9/542 |
| | | | 717/124 |
| 2009/0172024 | A1* | 7/2009 | Hsu ........................ G06Q 10/10 |
| 2009/0222361 | A1 | 9/2009 | Smith et al. |
| 2009/0299987 | A1 | 12/2009 | Willson |
| 2009/0319550 | A1 | 12/2009 | Shau et al. |
| 2010/0023546 | A1 | 1/2010 | Silsby |
| 2011/0302226 | A1 | 12/2011 | Abadi et al. |
| 2012/0239612 | A1* | 9/2012 | George ............. G06F 17/30563 |
| | | | 707/602 |
| 2013/0103653 | A1* | 4/2013 | Carson ............. G06F 17/30303 |
| | | | 707/690 |
| 2013/0152080 | A1* | 6/2013 | Sachindran ......... G06F 9/44526 |
| | | | 718/1 |
| 2015/0199410 | A1* | 7/2015 | Redlich .................. G06Q 10/10 |
| | | | 726/27 |

FOREIGN PATENT DOCUMENTS

| | | |
|---|---|---|
| CN | 101556586 | 10/2009 |
| CN | 102236672 | 11/2011 |

OTHER PUBLICATIONS

Extended European Search Report dated Feb. 18, 2016, EP Patent Application No. 12878246.3, 8 pages.
Liskin, M., "Chapter 15: Importing, Exporting, and Linking Tables," Microsoft Access 97 for Windows SuperGuide, 1997, XP 2486703, pp. 687-739.
Utteraccess Forums, "Importing Zip File," (Web Page), Nov. 9, 2007, XP 55228439, 3 pages, available at http://www.utteraccess.com/forum/Importing.Zip-File-tl535313.html.
The International Searching Authority, Appl. No. PCT/US2012/040764 Search Report and the Written Opinion, 10 pp, dated Aug. 12, 2013.
Vcelak, Petr, et al., Semantically Interoperable Research Medical Data and Meta Data Extraction Strategy, On pp. 1938-1942; vol. 4, Oct. 15-17, 2011. <http://ieeexplore.ieee.org/stamp/stamp.jsp?arnumber=6098665>.
David Allen, "File Staging Using External Table Preprocessor", XP5538544A; 6 pages; Jun. 10, 2009.
Oracle White Paper, "Using the Preprocessor Feature with External Tables in Oracle Database 11g Release 2", XP55385845A;9 pages; Sep. 2010.
Jason Durbin, et al., "Oracle8 Distributed Database Systems—Chapter 1", Dec. 1, 1997, XP55506601, 39 pages, Retrieved from the Internet on Sep. 12, 2018. https://docs.oracle.com/cd/A64702_01/doc/server.805/a58247.pdf.

* cited by examiner

USER-DEFINED LOADING OF DATA ONTO A DATABASE

BACKGROUND

Data is commonly loaded onto databases from a number of different types of sources. Examples of various types of sources include a local storage location, a file transfer protocol (FTP) site, and Hadoop™ (e.g., stored within the Hadoop™ File system, which is also known as HDFS) In addition, the data that is loaded onto the databases often comprise various types of formats. Examples of various formats include Javascript object notation (JSON) files, extensible markup language (XML) files, custom binary formats, tarballs, and 7-Zip files.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
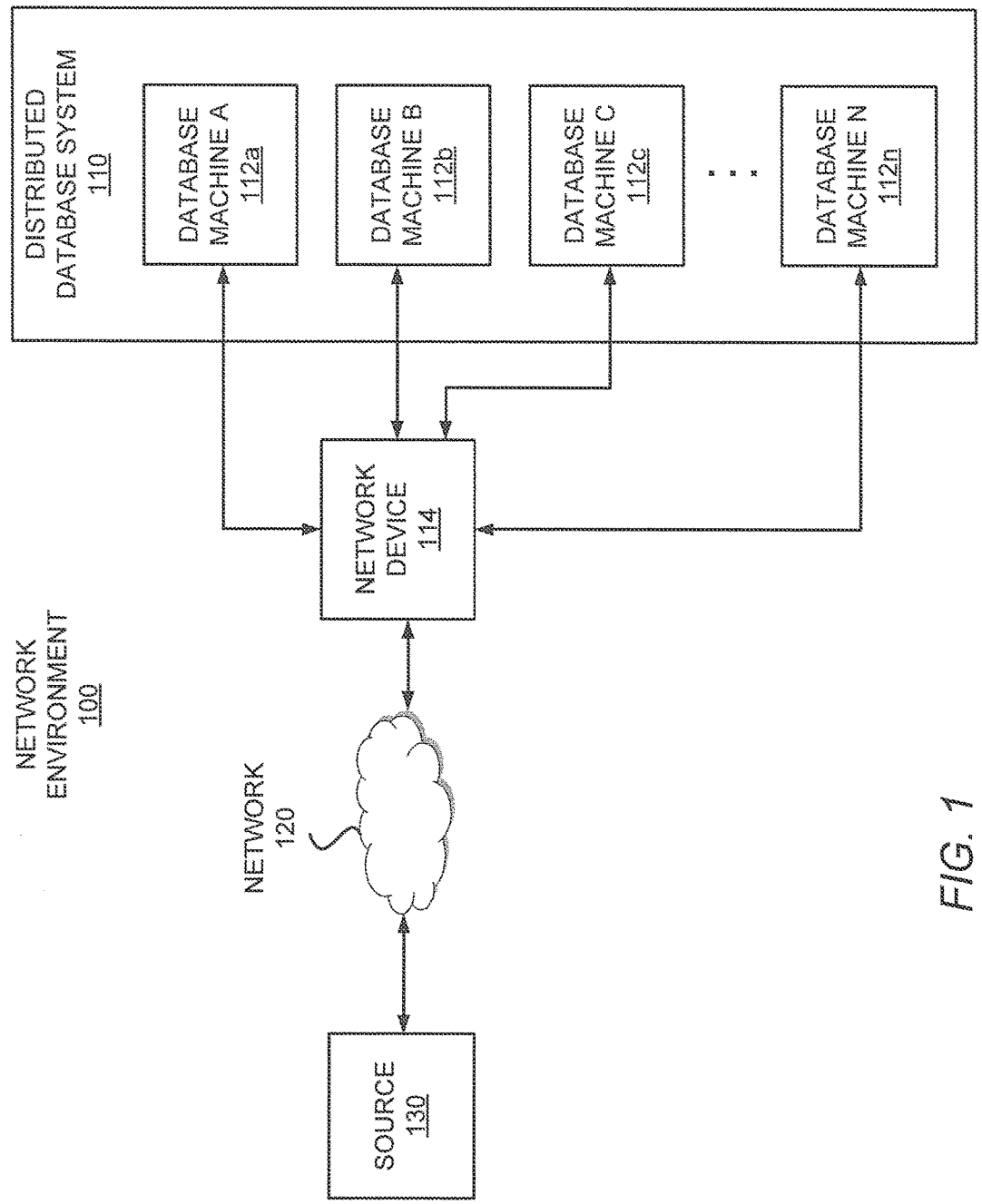
FIG. 1 shows a block diagram of a network environment, according to an example of the present disclosure.

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. In the present disclosure, the term "includes" means includes but not limited thereto, the term "including" means including but not limited thereto. The term "based on" means based at least in part on. In addition, the terms "a" and "an" are intended to denote at least one of a particular element.

As used throughout the present disclosure, the term "data" is generally intended to encompass electronic data, such as electronic mail (e-mail), word processing documents, spreadsheet documents, webpages, computer aided drawing documents, electronic file folders, database records, logs, sales information, patient information, etc.

Disclosed herein is a method for managing loading of data from a source onto a database. Also disclosed herein are an apparatus for implementing the method and a non-transitory computer readable medium on which is stored machine readable instructions that implement the method. As discussed herein, the method for managing loading of data from a source onto a database comprises providing an interface through which a user is to define logic related to the loading of the data onto the database, in which the user-defined logic pertains to a user-defined location identification of the source and retrieval of data from the source, a user-defined filter to be applied on the data, and a parsing operation to be performed on the data to convert the data into an appropriate format for the database. The method also includes receiving the user-defined logic and implementing the user-defined logic to load the data onto the database.

According to an example, the user-defined logic also pertains to a user-defined policy that defines a condition to be met prior to the data being retrieved from the source. In this example, the user-defined logic may be registered with the database meta-data, such that the loading of the data may be deferred to query time, which is also known as "late binding." In one regard, late binding enables federated use of the user-defined data sources, for instance, the ability to run SQL queries directly over data stored in HDFS. In addition, the user may define the user-defined policy to dynamically transition between immediate loading of the data onto the database and late binding. By way of example, the user may define the user-defined policy to automatically keep the last loaded content in the database for up to a week if the data set is accessed more than a predetermined number times in a predetermined time period via late binding. As another example, the user may define the user-defined policy to move the data set from the database to another storage, such as HDFS, if the data set is rarely used (e.g., used less than a predetermined number of times within a predetermined time period), and to access the data from the another storage via late binding.

In one regard, the late binding of the data may or may not actually need to persist to disk, because the data is only used for the duration of the query. Instead the data load operation may be streamed directly into the query processing pipeline as the data is being extracted by the user-defined load command disclosed herein.

Data to be loaded onto a database often has one of a variety of different types of formats and sizes. As such, it is typically impractical for any single piece of software to fully support every possible data format and encoding that may be of practical value to any number of users. In one regard, the method disclosed herein enables users to define customized logic or functions, such as programming, code, etc., to manage the loading of the data onto a database, and in certain instances, to manage data that has already been loaded onto the database. As such, a user may implement the method disclosed herein to load data onto a database regardless of the format and size of the data as well as the format of the source from which the data is to be loaded. Particularly, for instance, the method disclosed herein enables data that is at least one of encoded using a custom library, data that is in a custom format, data that is available via a custom source, etc., to be loaded onto the database in a relatively simple manner.

In addition, the user-defined logic of at least one user may be stored for later retrieval by the user or by other users, In this regard, users may mix and match the stored user-defined logic to manage loading of various types of data from various types of sources on to various types of databases, without having to define the logic each time the data is to be loaded. Furthermore, users may access the stored user-defined logic to manage data that has already been loaded onto the database.

According to an example, the method disclosed herein is implemented by an apparatus that also manages the database. As such, a uniform interface for loading the data, which includes a relatively simple user interface, may be employed to manage the loading of the data. In addition, management tools may relatively easily track and support the loading of the data. Moreover, the loading of the data may substantially be optimized, for instance, to substantially minimize bottlenecks, to substantially maximize efficiency, etc.

Through implementation of various examples of the present disclosure, users may be provided with an interface and options that afford a relatively high level of flexibility in managing the loading of data onto a database. In addition, the users may customize various aspects of the loading of the data, as well as the management of data that has already been loaded onto the database, without having to understand and cope with a full-fledged distribution computation system. As such, the various examples of the present disclosure enable users to load the data onto a database, as well as management of the data on the database, in a relatively simple and efficient manner.

With reference first to FIG. 1, there is shown a block diagram of a network environment 100, according to an example of the present disclosure. The network environment 100 is depicted as including a distributed database system 110, a network device 114, a network 120, and a source 130. The distributed database system 110 is also depicted as having a plurality of database machines 112a-112n, in which "n" represents an integer greater than one. It should be understood that the network environment 100 may include additional components and that one or more of the components described herein may be removed and/or modified without departing from a scope of the network environment 100. For instance, the network environment 100 may include any number of database machines 112a-112n and sources 130.

The database machines 112a-112n comprise servers or other apparatuses on which data is stored and that are able to receive data transferred from the source 130. According to another example, a database machine 112a comprises a machine that manages the transfer of the data between other database machines 112b-112n, without having the data stored on the database machine 112a. The distributed database system 110 is a database in which the database machines 112a-112n are not all attached to a common central processing unit (CPU). In one regard, the distributed database system 110 enables data to be stored in multiple ones of the database machines 112a-112n, which may be located in one physical location or dispersed in geographically disparate locations. According to an example, the database provided or hosted by the distributed database system 110 is a relational database.

The network device 114 comprises any of, for instance, a network switch, router, hub, etc., through which data may be communicated to and from the database machines 112a-112n. In addition, or alternatively, at least two of the database machines 112a-112n may be directly connected to each other, i.e., without going through the network device 114. The network 120 represents an infrastructure through which the database machines 112a-112n may communicate with the source 130. In this regard, the network 120 comprises any of, a local area network, a wide area network, the Internet, etc., and may include additional network devices 114, which are not shown. Although not shown, any of the database machines 112a-112n may be connected to the network 120 through a plurality of network devices 114, for instance, a series of interconnected switches.

Various manners in which data is loaded from the source 130 onto a database hosted on the distributed database system 110, for instance, on at least one of the database machines 112a-112n, are described in detail herein below. Particularly, the loading of data from the source 130 to the database may be managed in a manner that enables users, such as computer system administrators, information technology personnel, end users, etc., to substantially customize any of extraction, transformation, and loading of the data onto the database, as well as management of previously loaded data, in a relatively simple and efficient manner. In addition, the data may be loaded from the source 130 to the database in a substantially optimized manner, as also discussed in greater detail herein below.

The loading of the data may be considered as being substantially optimized when at least one of the amount of time required to load the data is substantially minimized, the number of copies of the data being loaded is substantially minimized, the consumption of network resources is substantially minimized during the loading of the data, the use of the most efficient network resources is substantially maximized during the loading of the data, etc. In addition, the loading of the data may be considered as being substantially optimized when the loading of the data is performed in a manner that is less than an optimized data loading manner in instances where the optimized data loading manner is infeasible, violates a policy, etc. Thus, for instance, the loading of the data may be considered as being substantially optimized when the loading of the data is performed in a manner that is optimized with respect to any of a variety of constraints applicable on the loading of the data.

Figure 2:
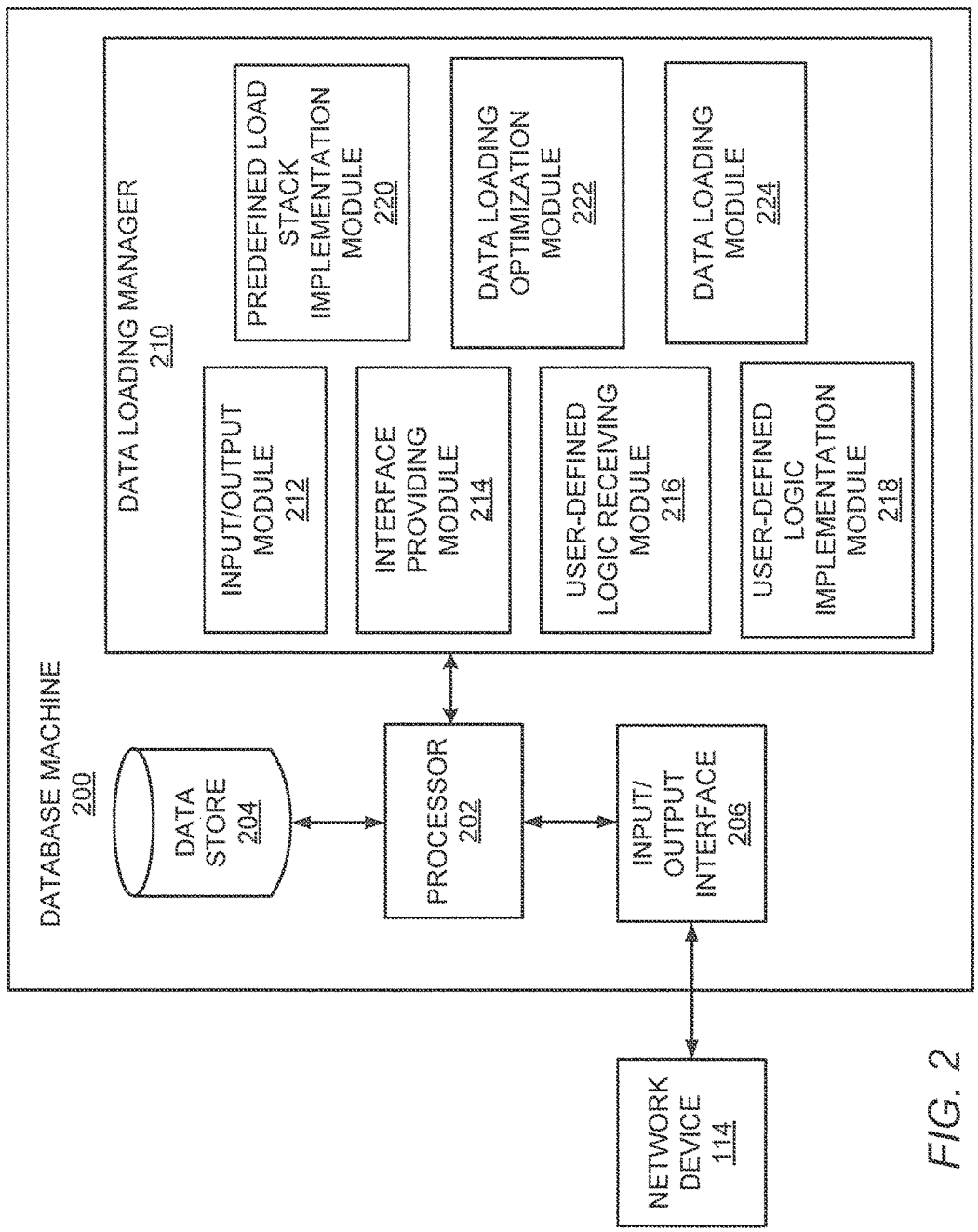
FIG. 2 illustrates a block diagram of a database machine, according to an example of the present disclosure.

Turning now to FIG. 2, there is shown a block diagram of a database machine 200, according to an example of the present disclosure. The database machine 200 generally represents any of the database machines 112a-112n depicted in FIG. 1. It should be understood that the database machine 200 may include additional components and that one or more of the components described herein may be removed and/or modified without departing from a scope of the database machine 200.

The database machine 200 is depicted as including a processor 202, a data store 204, an input/output interface 206, and a data loading manager 210. The database machine 200 comprises any of, for instance, a server, a computer, a laptop computer, a tablet computer, a personal digital assistant, a cellular telephone, or other electronic apparatus that is to perform a method for managing loading of data from a source onto a database disclosed herein. The database machine 200 may therefore store the data and/or may manage the storage of data in other database machines 112a-112n.

The data loading manager 210 is depicted as including an input/output module 212, an interface providing module 214, a user-defined logic receiving module 216, a user-defined logic implementation module 218, a predefined load stack implementation module 220, a data loading optimization module 222, and a data loading module 224. The processor 204, which may comprise a microprocessor, a micro-controller, an application specific integrated circuit (ASIC), or the like, is to perform various processing functions in the database machine 200. One of the processing functions includes invoking or implementing the modules 212-224 contained in the data loading manager 210 as discussed in greater detail herein below.

According to an example, the data loading manager 210 comprises a hardware device, such as a circuit or multiple circuits arranged on a board. In this example, the modules 212-224 comprise circuit components or individual circuits. According to another example, the data loading manager 210 comprises a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like. In this example, the modules 212-224 comprise software modules stored in the data loading manager 210. According to a further example, the modules 212-224 comprise a combination of hardware and software modules.

The input/output interface 206 comprises a hardware and/or a software interface. In any regard, the input/output interface 206 may be connected to a network, such as the Internet, an intranet, etc., through the network device 114, over which the data loading manager 210 may receive and communicate information, for instance, information relevant to the user-defined logic and the loading of the data, The processor 202 may store information received through the input/output interface 206 in the data store 204 and may use the information in implementing the modules 212-224. The data store 204 comprises volatile and/or non-volatile memory, such as DRAM, EEPROM, MRAM, phase change RAM (PCRAM), Memristor, flash memory, and the like. In addition, or alternatively, the data store 204 comprises a device that is to read from and write to a removable media, such as a floppy disk, a CD-ROM, a DVD-ROM, or other optical or magnetic media.

Figure 3:
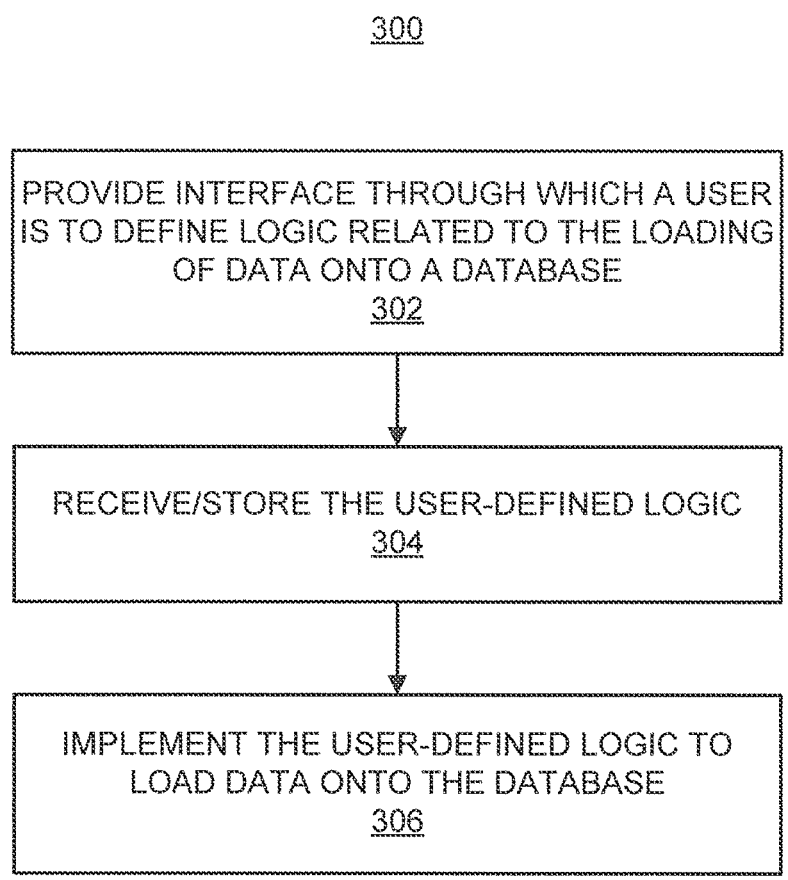
FIGS. 3 and 4, respectively, depict flow diagrams of methods for managing loading of data from a source to a database, according to examples of the present disclosure.
Figure 4:
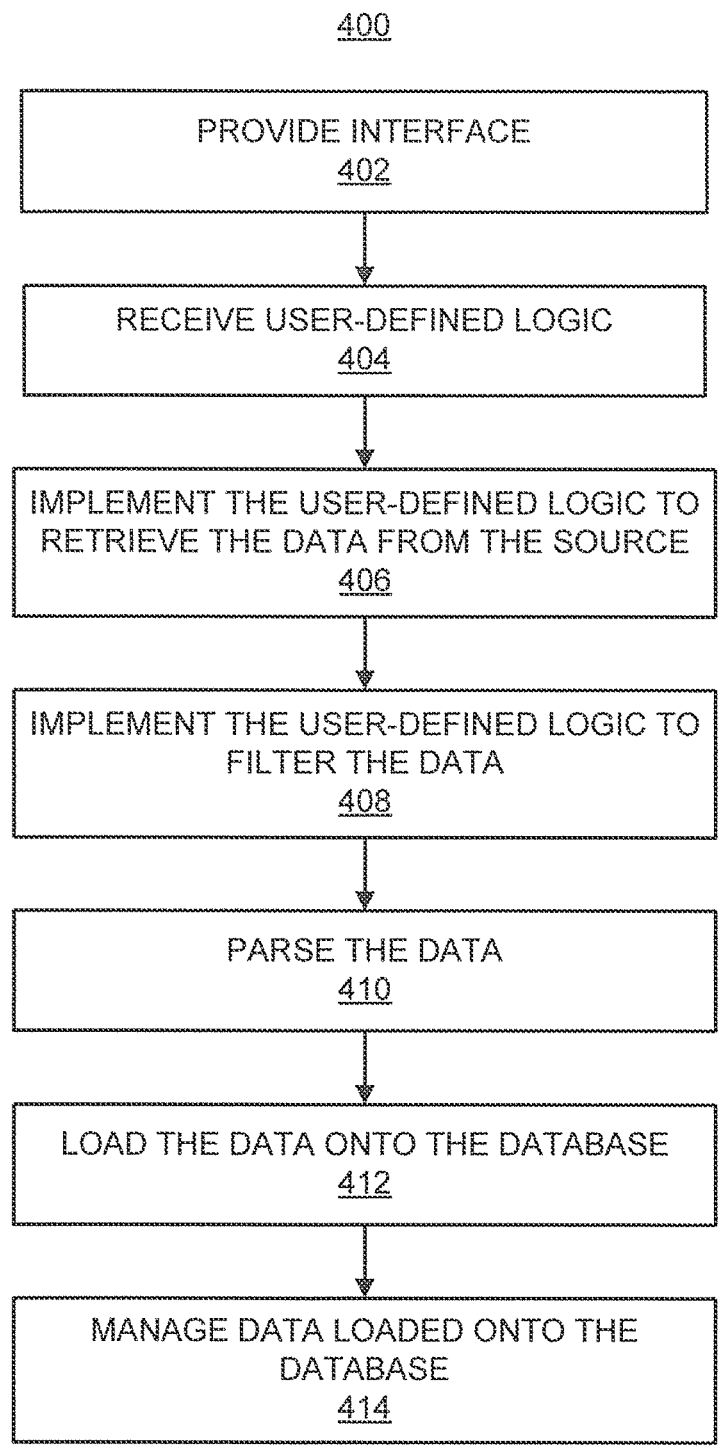

Various manners in which the modules 212-224 may be implemented are discussed in greater detail with respect to the methods 300 and 400 depicted in FIGS. 3 and 4. FIGS. 3 and 4, respectively depict flow diagrams of methods 300, 400 for managing loading of data from a source 130 to a database that is hosted on at least one of the database machines 112a-112n, 200, according to an example of the present disclosure. It should be apparent to those of ordinary skill in the art that the methods 300 and 400 represent generalized illustrations and that other operations may be added or existing operations may be removed, modified or rearranged without departing from the scopes of the methods 300 and 400. Although particular reference is made to the data loading manager 210 depicted in FIG. 2 as comprising an apparatus and/or a set of machine readable instructions that may perform the operations described in the methods 300 and 400, it should be understood that differently configured apparatuses and/or machine readable instructions may perform the methods 300 and 400 without departing from the scopes of the methods 300 and 400. The method 400 is related to the method 300 in that the method 400 includes operations in addition to those included in the method 300. Thus, the method 400 is to be construed as including all of the features discussed below with respect to the method 300.

Generally speaking, the methods 300 and 400 may separately be implemented to manage loading of data from a source 130 to a database hosted on at least one of the database machines 112a-112n. In one regard, the methods 300 and 400 may be implemented to manage the loading of the data, such that a user may relatively easily customize various stages associated with loading of the data. In another regard, the methods 300 and 400 may be implemented to manage the loading of the data, such that the data is transferred in a substantially optimized manner, as discussed above. In a further regard, the method 400 may be implemented to manage data that is loaded onto the database, for instance, to manage the conditions under which the loaded data is transferred to another storage.

The source 130 may comprise a single entity or a plurality of entities on which data is stored. Likewise, the database onto which the data from the source 130 is to be loaded may comprise a single database machine 112a or a plurality of database machines 112a-112n. In addition, the source 130 may comprise the same or a different number of entities than the database machine(s) 112a-112n, 200 onto which the data is to be loaded. According to an example, the methods 300, 400 are implemented in a database machine 112a-112n, 200. In a further example, the methods 300, 400 are implemented in a plurality of database machines 112a-112n.

With reference first to FIG. 3, at block 302, an interface through which a user is to define logic related to the loading of the data onto the database is provided, for instance, by the interface providing module 214. The interface may comprise, for instance, a portal, such as a web portal, a desktop portal, etc., that provides various options and features to a user regarding the loading of data onto a database from a source 130. According to an example, the interface is displayed on a monitor that is local to the database machine 200, i.e., connected to the database machine 200, or remote from the database machine 200, i.e., connected to a client machine (not shown) of the database machine 200.

The interface generally provides a mechanism through which a user may direct the data loading manager 210 to load data from the source 130. Particularly, the interface provides a mechanism through which the user may define logic pertaining to a user-defined location identification of the source 130, a user-defined filter to be applied on the data, and a parsing operation to be performed on the data to convert the data into an appropriate format for the database. The interface may also provide a mechanism through which the user may define logic pertaining to a user-defined policy that defines a condition to be met prior to the data being retrieved from the source. The user-defined policy may in addition, or alternatively, define how data loaded onto the database is to be managed.

According to an example, the interface provides the user with access to a library that includes previously defined logic. in addition, or alternatively, the interface provides the user with the ability to program the logic, for instance, through any suitable programming language, such as C++, structured query language (SQL), etc. Thus, for instance, the user may define the logic related to the loading of the data from the source 130 to the database by directly programming the logic or by selecting a previously defined, e.g., programmed, logic. The previously defined logic may have been created by the user, another user, a programmer of the data loading manager, a third-party vendor, etc., and stored in the library.

Generally speaking, the user-defined logic provides mechanisms by which users may write and install custom libraries to handle various stages of the data loading process. In one regard, by providing users with an interface to define logic for performing various stages of the data loading process, users are able to selectively replace arbitrary portions of a data-load stack with custom implementations. In addition, users, such as developers, may write fully-functional and interchangeable logic for the various stages of the data loading process. Users are therefore provided with a relatively high level of flexibility in loading various types of data from various types of sources 130 onto a database.

In one example, the user defines a location identification of the source 130. The location identification of the source 130 may comprise, for instance, an Internet Protocol (IP) address of the source 130, or other location identifier of the source 130 that may be used to access the source 130. The user may also define parameters associated with accessing the appropriate data from the source 130. The parameters may include, for instance, the particular folder in which the data is stored on the source 130 as well as the file name of the data. In addition, the parameters may include appropriate passwords, security keys, and other information that may be required to access the data on the source 130.

In another example, the user defines at least one filter to be applied to the data retrieved from the source 130. The user may define the at least one filter based upon various factors associated with the data, such as whether the data is compressed, what type of compression scheme was used to compress the data, whether the data is to be compressed, what type of compression scheme is to be used to compress the data, whether the data is to be converted from one format to another, the type of format to which the data is to be converted, whether the data is to be decrypted, what type of decryption scheme is to be employed, etc. As such, the filter(s) may comprise at least one of a filter to decompress the data, a filter to compress the data, a filter to convert the data from one format to another, a filter to decrypt the data, a filter to render the data (for instance, convert a JPEG image to a bitmap form), etc.

In a further example, the user defines a parsing operation to be performed on the data to convert the data into an appropriate format for loading onto the database. Alternatively, the suitable parsing operation may be predefined because the format required for the database may already be known. In any regard, the parsing operation may comprise formatting of the data into tuples for use by the database system 110, which may comprise a relational database system.

In a yet further example, the user defines a policy that defines a condition to be met prior to the data being retrieved from the source. In this regard, the user-defined policy may cause the loading of the data onto the database to be deferred, for instance, until query time, which is also known as "late binding." In one regard, late binding enables federated use of the user-defined data sources, for instance, the ability to run SQL queries directly over data stored in HDFS. In addition, the user may define the user-defined policy to dynamically transition between immediate loading of the data onto the database and late binding.

According to an example, the late binding capability is implemented through use of External Tables, in which an EXTERNAL keyword is added to SQL CREATE TABLE, which indicates to the database that the data is not stored within the database. Whereas typical use of External tables involves providing a list of data files external to the database, in case of the user-defined logic disclosed herein, the COPY command is associated with the CREATE EXTERNAL TABLE statement. As such, whenever the External table is used in a query, the user-defined logic command is run to first load the data into the database and the query is run on top of the user-defined logic command. In another example, the late binding capability is implemented through use of the meta-data on the source system, for instance, in the case of Hadoop™, HCatalog is used as the meta-data source.

In a yet further example, the user defines a policy that defines how data loaded onto the database is to be managed. In this regard, the user-defined policy may cause the data loaded onto the database to be managed in particular manners. By way of example, the user may define the user-defined policy to automatically keep the last loaded content in the database for up to a week if the data set is accessed more than a predetermined number times in a predetermined time period via late binding. As another example, the user may define the user-defined policy to move the data set from the database to another storage, such as HDFS, if the data set is rarely used (e.g., used less than a predetermined number of times within a predetermined time period), and to access the data from the another storage via late binding.

At block 304, the user-defined logic is received, for instance, by the user-defined logic receiving module 216. According to an example, a user may define the logic related to the loading of the data from the source 130 onto the database through the interface and may submit the defined logic through the interface. In this regard, for instance, the interface may provide a user-defined logic submission feature, which the user may select to submit the user-defined logic to the data loading manager 210.

In addition, at block 304, the user-defined logic may be stored in a library, for instance, to enable the user-defined logic to be retrievable for later use by the user or by another user. In this example, the user may provide a title for the logic that the user defined, for instance, as the logic relates to the source 130, the format of the data, and/or the types of filters that have been defined. The user-defined logic may therefore be stored using a descriptive title to enable users to find and implement the user-defined logic.

Once the user-defined logic has been written, compiled, and received, the database engine, for instance, the processor 202, is to be informed of the existence of the user-defined logic. This is performed, for instance, through the addition of new SQL statements to the database machine 112a that allow registration of a user-defined logic based on the path of the shared library representing the compiled user-defined logic, and the name of the user-defined logic object inside that shared library that is to be used.

At block 308, the user-defined logic is implemented to load the data onto the database from the source 130, for instance, by the user-defined logic implementation module 218. Although not shown, the user-defined logic may be implemented as part of a pre-configured data-load stack, for instance, by the predefined load stack implementation module 220. Particularly, for instance, the predefined load stack implementation module 220 may perform predefined functions in addition to the functions corresponding to the user-defined logic. The predefined functions may include, for instance, a parsing operation that transforms the data into a format suitable for loading the data onto the database, a converting operation to convert data from a particular format to a format that is compatible for processing in the parsing operation, etc. The predefined functions may also include, for instance, invocation of various calls associated with implementation of the user-defined filters.

According to an example, to invoke the user-defined logic, an extension to the existing syntax for loading files into a database is generated, for instance, the COPY statement. The COPY statements add a WITH clause. By way of particular example, a user may write "WITH SOURCE MyExampleSource( )" or "WITH PARSER MyExampleParser( )". The calls may also take keyword arguments; for example, "WITH FILTER MyExampleFilter (argument="value", integer_argument=12345)". Arguments are passed to the user-defined logic, which may use them to inform how the user-defined logic performs the computation that the user-defined logic is performing.

In any regard, and according to an example, because the user-defined logic is implemented by the data loading manager 210, which may also manage the database, the loading operation may substantially be optimized, for instance, by the data loading optimization module 222. More particularly, for instance, the data loading optimization module 222 may obtain information relevant to the loading of the data from the source 130, such as the number of sources 130 from which the data is to be loaded, the number of database machines 112*a*-112*n* available for receiving the data, the locations of the sources 130, the locations of the database machines 112*a*-112*n*, the type of data to be transferred, the size of the data to be transferred, the content of the data, the types of filters to be applied to the data, etc. The data loading optimization module 222 may obtain the information relevant to the loading of the data as part of the receipt of the user-defined logic.

In addition, the data loading optimization module 222 may determine a data loading operation that substantially optimizes the loading of the data based upon the information relevant to the loading of the data. The substantially optimized data loading operation may be determined through implementation of any of a variety of different types of optimizers on the information relevant to the loading of the data. For instance, a rule-based optimizer may be implemented that determines the substantially optimized data loading operation based upon whether the information relevant to the data loading indicates that predetermined conditions have been met. In this example, the rule-based optimizer may be programmed with instructions that indicate that certain data loading operations are to be implemented under certain conditions.

As another example, a cost-based optimizer may be implemented that determines the data loading operation based upon a determination as to which data loading implementation results in the lowest cost. For instance, the cost-based optimizer may run predictive models on various data loading operation scenarios, determine costs associated with each of the data loading operation scenarios, and may identify the data loading operation scenario that results in the lowest cost to transfer the data. The cost in this example may comprise any of, for instance, resource utilization, energy utilization, bandwidth consumption, etc.

As a further example, a machine-learning optimizer that employs historical information to determine the data loading operation may be implemented. In this example, the machine-learning optimizer may take as inputs various historical information pertaining to the loading of data onto the database machines 112*a*-112*n* and may use the historical information to determine, based upon the information relevant to the current loading of data, the data loading operation that substantially optimizes the current loading of the data. Any of a number of suitable machine-learning optimizers may be employed in this example.

Regardless of the type of optimizer implemented, any of a number of various types of data loading operations may be employed to substantially optimize the transfer of the data. In addition, various combinations of types of data loading operations may be employed to substantially optimize the loading of the data.

According to an example, the user-defined logic is implemented to stream the data from the source 130, to filter the data as the data is being streamed, to parse the streamed data, and to load the parsed data onto the database. In this example, a relatively large data file may be loaded onto the database without first storing the data file locally. Alternatively, however, the data may first be stored locally from the source 130 prior to performance of the filtering, parsing, and loading operations. Various operations that the data loading manager 210 may implement in loading the data onto the database from the source 130 are described in greater detail with respect to the method 400 depicted in FIG. 4.

Turning now to FIG. 4, at block 402, an interface through which a user is to define logic related to the loading of the data onto the database is provided, for instance, by the interface providing module 214. Block 402 is similar to block 302 discussed above with respect to FIG. 3. In addition, at block 404, the user-defined logic is received, for instance, by the user-defined logic receiving module 216, which is similar to block 304 discussed above with respect to FIG. 3.

At block 406, the user-defined logic is implemented to retrieve the data from the source 130, for instance, by the user-defined logic implementation module 218. Particularly, the user-defined logic pertaining to a user-defined location identification of the source 130 is used to retrieve the data from the source 130. Thus, for instance, the user-defined logic implementation module 218 accesses the data based upon the user-defined location identification associated with the location of the source 130 and a particular file location on the source 130. As discussed above, the user-defined logic may include various information that enable the data loading manager 210 to access and retrieve the data stored on the source 130, such as passwords, security keys, etc. The user-defined logic implementation module 218 may also use the various information to access and retrieve the data from the source 130. As also discussed above, block 406 may be implemented at a deferred time from the time at which the user-defined logic is received at block 404, for instance, during a query time.

At block 408, the user-defined logic is implemented to filter the data retrieved from the source 130, for instance, by the user-defined logic implementation module 218. As discussed above, the user may define at least one filter to be applied onto the data, for instance, to process the data to be in a better or a more compatible form for loading onto the database. The filter may include, for instance, at least one of a filter to decompress the data, a filter to compress the data, a filter to convert the data from one format to another, etc.

In an example in which the data stored on the source 130 has been compressed using a particular compression scheme, the user-defined logic may define a filter that is to decompress the data. Thus, for instance, if the data has been compressed using a zip compression scheme (e.g., BZIP, GZIP, 7-ZIP, etc.), the user may define the logic to decompress the data using an appropriate decompression scheme.

As another example, in which the data stored on the source 130 is in a first format, the user-defined logic implementation module 218 may implement a filter that converts the data from the first format to a second format, as defined by the user. In this example, the user may define a filter that converts the data from the first format, for instance, a native format, to the second format, for instance, a Native Varchar (NChar) format. In defining the filter, the user may specify that a particular converter program be executed to perform the conversion of the data. In one example, the particular converter program may comprise a previously defined program that the user may specify by an identification of the particular converter program. In this example, the user-defined logic implementation module 218 may be able to access the previously defined program, either from a local library or from a remote location. In any regard, the second format may comprise a format from which the data may appropriately be formatted for loading onto the database. By way of particular example, the filter may be defined to convert the data from a first format to a second format that is readily converted to a format suitable for being parsed into a format in which data is stored in the database.

At block 410, the data is parsed to convert the filtered data into an appropriate or compatible format for the database, for instance, by the user-defined logic implementation module 218. The parsing operation performed on the filtered data may be user-defined, i.e., the user may define the particular parsing operation to be performed on the filtered data. Alternatively, the parsing operation may be predefined in the user-defined logic implementation module 218 because the appropriate or compatible format for the database may already be known.

At block 412, the parsed data is loaded onto the database, for instance, by the data loading module 224. According to an example, the data loading module 224 loads the parsed data directly onto a particular database machine 112a. In another example, the data loading module 224 loads the parsed data onto multiple database machines 112a-112n according to a data loading optimization operation, for instance, as determined by the data loading optimization module 222. Various manners in which the data loading optimization module 222 may substantially optimize the loading of the data onto multiple ones of the database machines 112a-112n are described in greater detail herein above with respect to the method 300. The loading of the data may be substantially optimized by at least one of segmenting and/or sorting the data and by storing the data in the segmented and/or sorted manner on multiple ones of the database machines 112a-112n.

According to an example, the loading of the data may also substantially be optimized through implementation of the method 400 on multiple ones of the database machines 112a-112n, to thereby distribute the workload associated with loading the data. Thus, for instance, a plurality of the database machines 112a-112n may retrieve different portions of the data and may concurrently filter, parse, and load the data. As another example, one of the database machines 112a may retrieve the data from the source 130, another one of the database machines 112b may filter the data, and another one of the database machines 112c may parse and load the data. The implementation of the database machines 112a-112n that substantially optimizes the loading of the data onto the database may be determined through performance of any suitable optimization technique.

According to an example, blocks 406-412 are implemented while the data is streamed from the source 130. In this example, therefore, relatively small portions of the data are processed at a given time, thereby, substantially minimizing data storage requirements of the database machines 112a-112n. In addition, an input buffer and an output buffer may be implemented, in which the input buffer contains some input from the stream of data and the output buffer is used to write process data from the input buffer.

In another example, at block 406, all of the data is copied from the source 130 and saved, for instance, in the data store 204. In this example, blocks 408-412 are implemented on the stored copy of the data, which therefore requires that the database machines 112a-112n have relatively larger data storage capabilities.

At block 414, the data loaded onto the database is managed, for instance, by the user-defined logic implementation module 218. As discussed above, the data loaded onto the database may be managed, for instance, to control the length of time during which the data is stored in the database, conditions under which the data is to transferred to another storage, etc.

Some or all of the operations set forth in the methods 300 and 400 may be contained as a utility, program, or subprogram, in any desired computer accessible medium, In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium. Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 5:
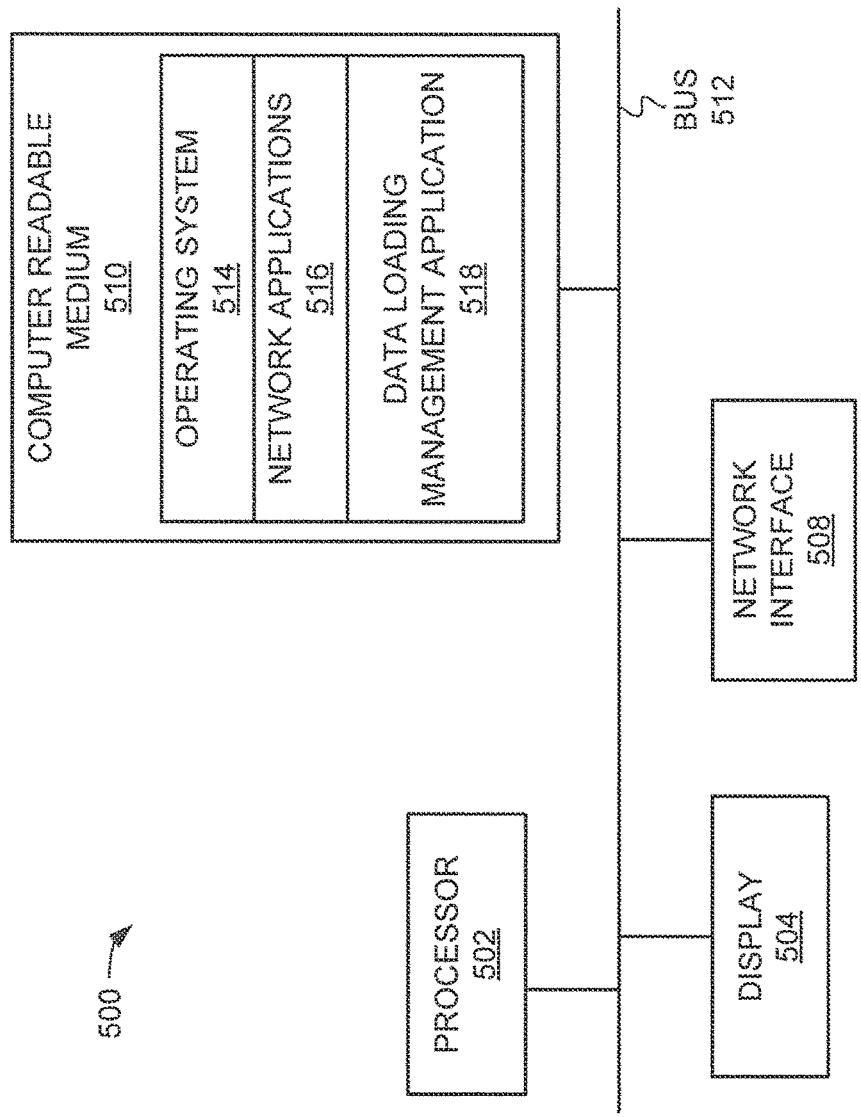
FIG. 5 illustrates a schematic representation of a computing device, which may be employed to perform various functions of the database machines depicted in FIGS. 1 and 2, according to an example of the present disclosure.

Turning now to FIG. 5, there is shown a schematic representation of a computing device 500, which may be employed to perform various functions of the database machines 112a-112n, 200 respectively depicted in FIGS. 1 and 2, according to an example. The computing device 500 includes a processor 502, such as but not limited to a central processing unit; a display device 504, such as but not limited to a monitor; a network interface 508, such as but not limited to a Local Area Network LAN, a wireless 802.11 LAN, a 3G/4G mobile WAN or a WiMax WAN; and a computer-readable medium 510. Each of these components is operatively coupled to a bus 512. For example, the bus 512 may be an EISA, a PCI, a USB, a FireWire, a NuBus, or a PDS.

The computer readable medium 510 comprises any suitable medium that participates in providing instructions to the processor 502 for execution. For example, the computer readable medium 510 may be non-volatile media, such as memory. The computer-readable medium 510 may also store an operating system 514, such as but not limited to Mac OS, MS Windows, Unix, or Linux; network applications 516; and a data loading management application 518. The operating system 514 may be multi-user, multiprocessing, multitasking, multithreading, real-time, and the like. The operating system 514 may also perform basic tasks such as but not limited to recognizing input from input devices, such as but not limited to a keyboard or a keypad; sending output to the display 504; keeping track of files and directories on medium 510; controlling peripheral devices, such as but not limited to disk drives, printers, image capture device; and managing traffic on the bus 512. The network applications 516 include various components for establishing and maintaining network connections, such as but not limited to machine readable instructions for implementing communication protocols including TCP/IP, HTTP, Ethernet, USB, and FireWire.

The data loading management application 518 provides various components for managing loading of data from a source to a database system as discussed above with respect to the methods 300 and 400 in FIGS. 3 and 4. The data loading management application 518 may thus comprise the input/output module 212, the interface providing module 214, the user-defined logic receiving module 216, the user-defined logic implementation module 218, the predefined load stack implementation module 220, the data loading optimization module 222, and the data loading module 224. In this regard, the data loading management application 518 may include modules for performing the methods 300 and/or 400.

In certain examples, some or all of the processes performed by the application 518 may be integrated into the operating system 514. In certain examples, the processes may be at least partially implemented in digital electronic circuitry, or in computer hardware, machine readable instructions (including firmware and software), or in any combination thereof, as also discussed above.

What has been described and illustrated herein are examples of the disclosure along with some variations. The terms, descriptions and figures used herein are set forth by way of illustration only and are not meant as limitations, Many variations are possible within the scope of the disclosure, which is intended to be defined by the following claims—and their equivalents—in which all terms are meant in their broadest reasonable sense unless otherwise indicated.

What is claimed is:

1. A method for managing loading of data from a source onto a database, said method comprising:
   providing, by a processor, an interface through which a user is to define a logic to control the loading of the data onto the database;
   receiving, by the processor, the user-defined logic via the interface, wherein the user-defined logic comprises a user-defined location identification of the source, a user-defined filter to be applied on the data, a user-defined parsing operation to be executed on the data to convert the data into a format compatible with the database, and a user-defined policy that defines that the data is to be retrieved from the source during a query time;
   determining, by the processor, that the query time has been reached;
   based on a determination that the query time has been reached, converting, by the processor, the data into a format compatible with the database according to the received user-defined logic;
   determining, by the processor, a data loading operation that optimizes loading of the data from the source to the database; and
   loading, by the processor, the converted data onto the database according to the determined data loading operation.

2. The method according to claim 1, wherein providing the interface further comprises providing the interface through which the user is to define the logic by programming the logic, said method further comprising:
   storing the programmed logic in a library.

3. The method according to claim 1, wherein providing the interface further comprises providing access to a library on which is stored previously defined logic through the interface, and wherein receiving the user-defined logic further comprises receiving previously stored logic from the library.

4. The method according to claim 1, wherein the user-defined filter to be applied on the data is to at least one of: decompress, compress, or convert the data.

5. The method according to claim 1, wherein converting the data into a format compatible with the database according to the received user-defined logic further comprises executing the user-defined logic as part of a pre-configured data-load stack.

6. The method according to claim 1, further comprising:
   retrieving the data from the source using the user-defined location identification of the source;
   filtering the data using the user-defined filter;
   parsing the data by executing the parsing operation; and
   wherein loading the converted data includes loading the parsed data onto the database.

7. The method according to claim 6, wherein retrieving, filtering, parsing, and loading the parsed data further comprises retrieving, filtering, parsing, and loading the parsed data as the data is streamed from the source.

8. The method according to claim 1, further comprising executing the user-defined logic in a system that manages the database, wherein the system that manages the database comprises a distributed database system and wherein executing the user-defined logic further comprises executing the user-defined logic on a plurality of systems in the distributed database system while executing a database optimization operation.

9. The method according to claim 1, wherein the user-defined logic further comprises a user-defined policy that defines how data loaded onto the database is to be managed.

10. An apparatus for managing loading of data from a source onto a database, the apparatus comprising:
    a processor; and
    a memory on which is stored machine readable instructions that when executed by the processor cause the processor to:
      provide an interface through which a user is to define functions to control the loading of the data onto the database;
      receive the user-defined functions via the interface, wherein the user-defined functions comprise a user-defined parsing operation to be executed on the data to convert the data into a format compatible with the database and a user-defined policy that defines that the data is to be retrieved from the source during a query time;
      determine that the query time has been reached;
      based on a determination that the query time has been reached, convert the data into a format compatible with the database according to the received user-defined functions;
      determine a data loading operation that optimizes loading of the data from the source to the database; and
      load the converted data onto the database according to the determined data loading operation.

11. The apparatus according to claim 10, wherein the database is a relational database.

12. The apparatus according to claim 10, wherein the user-defined functions further comprise a user-defined policy that defines at least one condition to be met prior to the data being retrieved from the source and management of the data loaded onto the database, and wherein the instructions are further to cause the processor to:
    retrieve the data from the source using a user-defined location identification of the source;
    filter the data using a user-defined filter;
    parse the data by executing the parsing operation; and
    load the parsed data onto the database.

13. The apparatus according to claim 10, wherein the apparatus comprises a database management apparatus.

14. The apparatus of claim 10, wherein the user-defined functions further comprise at least one a user-defined location identification of the source or a user-defined filter to be applied on the data.

15. The apparatus of claim 14, wherein the user-defined filter to be applied on the data is to at least one of: decompress, compress, or convert the data.

16. A non-transitory computer readable storage medium on which is stored machine readable instructions that when executed by a processor, cause the processor to:
    provide an interface through which a user is to define code to control loading of data onto a database, wherein the user-defined code includes a user-defined location identification of the source, a user-defined policy that defines that the data is to be retrieved from the source during a query time;
    receive the user-defined code;
    determine that the query time has been reached;
    based on a determination that the query time has been reached, execute the user-defined code to transform the data into a format that is compatible with the database;

determine a data loading operation that optimizes loading of the data from the source to the database; and execute the user-defined code to load the transformed data onto the database according to the determined data loading operation.

17. The non-transitory computer readable storage medium of claim 16, wherein the user-defined code further includes a user-defined filter to be applied on the data, instructions for management of the data loaded onto the database, or a parsing operation to be executed on the data to convert the data into a format that is compatible with the database.

18. The non-transitory computer readable storage medium of claim 17, wherein the user-defined filter to be applied on the data is to at least one of: decompress, compress, or convert the data.

19. The non-transitory computer readable storage medium of claim 17, wherein the instructions are further to cause the processor to execute the user-defined logic in a system that manages the database, wherein the system that manages the database comprises a distributed database system.

20. The non-transitory computer readable storage medium of claim 17, wherein the instructions are further to cause the processor to retrieve, filter, and parse the data, and to load the parsed data as the data is streamed from the source.

* * * * *